(12) United States Patent
Scarbrough et al.

(10) Patent No.: US 9,132,766 B2
(45) Date of Patent: Sep. 15, 2015

(54) TRANSFORMING CARGO TRAILER SYSTEM

(71) Applicants: Thomas Michael Scarbrough, Phoenix, AZ (US); Michael Shane Scarbrough, Phoenix, AZ (US); Michelle Griffin, Phoenix, AZ (US)

(72) Inventors: Thomas Michael Scarbrough, Phoenix, AZ (US); Michael Shane Scarbrough, Phoenix, AZ (US); Michelle Griffin, Phoenix, AZ (US)

( * ) Notice: Subject to any disclaimer, the term of this patent is extended or adjusted under 35 U.S.C. 154(b) by 91 days.

(21) Appl. No.: 13/733,852

(22) Filed: Jan. 3, 2013

(65) Prior Publication Data

US 2014/0183893 A1    Jul. 3, 2014

(51) Int. Cl.
*B60P 3/355*    (2006.01)
*B60P 3/34*    (2006.01)

(52) U.S. Cl.
CPC .. *B60P 3/341* (2013.01); *B60P 3/34* (2013.01)

(58) Field of Classification Search
CPC ........................................................ B60P 3/34
USPC ........................................................... 280/656
See application file for complete search history.

(56) References Cited

U.S. PATENT DOCUMENTS

| | | | | |
|---|---|---|---|---|
| 6,371,449 | B1* | 4/2002 | Chamberlain | 254/387 |
| 2007/0102948 | A1* | 5/2007 | Anderson | 296/35.3 |
| 2007/0126209 | A1* | 6/2007 | Wolfe | 280/656 |
| 2011/0121544 | A1* | 5/2011 | Pearce | 280/641 |

* cited by examiner

*Primary Examiner* — Keith Frisby

(57) ABSTRACT

What is proposed is a transforming cargo trailer system of which the basic embodiment is an enclosed box trailer that is built small and light enough to be towed behind a medium size motorcycle. The enclosed box trailer embodiment is comprised of a convertible cargo box, a frame assembly, a pair of suspension assemblies, an axle assembly, an air supply system, and means for adapting, reducing or transforming the enclosed box trailer embodiment into a toy hauler trailer embodiment, a common wagon box trailer embodiment, a flat-bed trailer embodiment, and a raised platform embodiment. Also, the enclosed box trailer embodiment can also be built in a large variety of models that can be utilized for a large variety of applications.

2 Claims, 7 Drawing Sheets

TRANSFORMING CARGO TRAILER SYSTEM

FIELD OF THE INVENTION

Our transforming cargo trailer system relates to flat-bed trailers, utility trailers, common wagon box trailers, camping trailers, motorcycle camping trailers, and fold out platform trailers.

BACKGROUND OF THE INVENTION

Typical flat-bed trailers, utility trailers, and common wagon box trailers are built for a single purpose, much the same as their forerunner, the ox-cart, the transportation of cargo.

Typical camping trailers are expensive, have very limited uses, and require:
- a gas guzzling vehicle that is powerful enough to safely tow them,
- an additional tow vehicle and trailer to transport recreational vehicles,
- the locating of a camping space that is close to a hard surface road,
- plenty of your effort and time to set up and tear down,
- a high degree of maintenance, and
- the added costs and trouble of being taken to a storage facility when not in use.

Typical motorcycle camping trailers have limited storage and sleeping space and are neither built strong enough nor configured as to be able to transport recreational vehicles.

Typical fold out platform trailers, although adequate for their intended uses, are not designed to be towed behind a medium size motorcycle and are not designed to be transformed into a variety of different trailer styles.

SUMMARY

The present invention, according to the basic embodiment, is an enclosed box trailer having means for being transformed into a toy hauler trailer embodiment, a common wagon box trailer embodiment, a flat-bed trailer embodiment, and a raised platform embodiment. The enclosed box trailer can be built small and light enough to be towed behind a medium size motorcycle and can also be built in a variety of models that can be utilized for a wide variety of applications.

There has been defined, rather broadly, the more important embodiments of our transforming cargo trailer system in order that the detailed descriptions thereof may be better understood, and the contribution to the art will be better appreciated. There are additional features that will be better described hereafter and will form the subject matter of the claims appended hereto.

In this respect, before explaining at least one embodiment in detail, it is to be understood that there is no limiting intent to the application of the details of construction and in the arrangements of the components set forth in the following descriptions or illustrated in the drawings. Our transforming cargo trailer system is capable of many embodiments that can be practiced and carried out in various ways. Also, it is to be understood that the phraseology and terminology employed herein are for the purpose of description only and should not be regarded as limiting.

The primary object is to provide a transforming cargo trailer system that will overcome the lack of versatility exhibited in the prior art.

Another object is to provide a transforming cargo trailer system providing an enclosed box trailer, a toy hauler trailer, a common wagon box trailer, a flat-bed trailer, and a raised platform within the same device.

Another object is to provide a transforming cargo trailer system that can be used as an enclosed box trailer, a toy hauler trailer, a common wagon box trailer, a flat-bed trailer, and a raised platform.

To the accomplishment of the above objects, with attention being drawn to the fact the drawings are illustrative only and the descriptions are representative only, that some changes may be made in the specific structures that are illustrated and described therein that are within the scope of the appended claims.

DRAWINGS

Figures

In the drawings and descriptions closely related figures and items have the same number but different alphabetic suffixes.

Figure 1A:
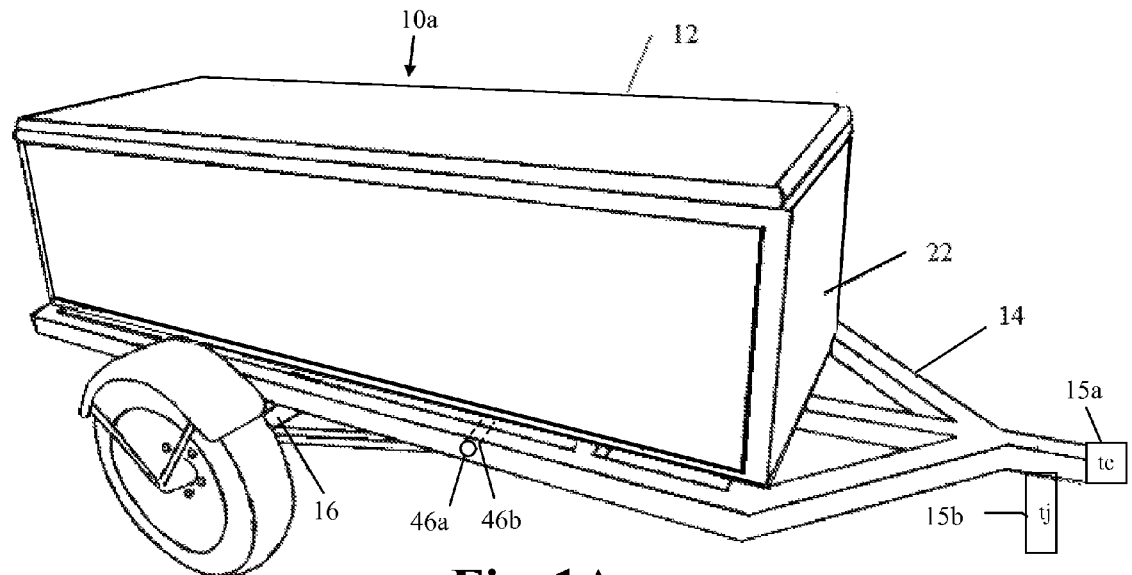
FIG. 1A shows a perspective view of the basic enclosed box trailer embodiment.

| Drawings - Reference Numerals | |
|---|---|
| 10a | enclosed box trailer |
| 10b | toy hauler trailer |
| 10c | common wagon box trailer |
| 10d | flat-bed trailer |
| 10e | raised platform |

-continued

Drawings - Reference Numerals

| | |
|---|---|
| 12 | convertible cargo box |
| 14 | frame |
| 15a | tow coupler |
| 15b | tongue jack |
| 16 | wheels mounted axle |
| 18 | bottom panel |
| 20 | bolt |
| 22 | front panel |
| 24 | rear panel |
| 26 | bolt |
| 26a | nut |
| 27 | hinge assembly |
| 27a | lock nut |
| 27b | threaded hinge pin |
| 27c | nut |
| 27d | flat washer |
| 27e | typical side panel end |
| 28 | right side panel |
| 29 | single hinge plate |
| 29a | hinge pin hole |
| 30 | top panel |
| 31 | double-hinge plate |
| 32 | left side panel |
| 34 | optional left side panel |
| 36 | air pressure regulator |
| 38 | air-line |
| 40 | pneumatic shock absorber |
| 41 | shock absorber top mount |
| 42 | air supply tank |
| 44 | spare tire carrier |
| 45 | spare tire carrier mount |
| 46 | drag link |
| 46a | drag-link bolt hole |
| 46b | drag-link mounting bolt |
| 48a | anti-sway bar top mount |
| 48b | anti-sway bar bottom mount |
| 50 | anti-sway bar |
| 51 | fender assembly |
| 52 | fender with braces |
| 52a | outer fender mount |
| 52b | outer jam nut |
| 52c | inner jam nut |
| 52d | grease cap |
| 52e | threaded stud |
| 53f | grease seal |
| 52g | washer |
| 52h | spacer |
| 52i | bearing nut |
| 54a | inner fender mount |
| 54b | nut |
| 55 | suspension assembly |
| 56 | shock absorber bottom mount |
| 58 | coil spring guide rod plate |
| 60 | coil spring guide rod mount |
| 62 | coil spring |
| 64 | coil spring guide rod |
| 65 | retainer pin |
| 66 | elevation hole |
| 68 | air-line |
| 70 | air pump |
| 72 | air-line |
| 74 | cargo hook |
| 76 | cargo rack mount |
| 78 | set screw |
| 80 | cargo rack |
| 82 | cargo ramp |
| 84 | outrigger mount |
| 86 | outrigger |
| 88 | leveling jack |
| 89a | support pole |
| 89b | support pole mount |
| 90 | platform |

DETAILED DESCRIPTION

FIGS. 1A to 1H—Basic Embodiment

In accordance with the basic embodiment of our transforming cargo trailer system FIG. 1A (perspective view) shows a enclosed box trailer 10a (in the highway towing mode) with a convertible cargo box 12 mounted onto a frame 14 with a front panel 22 attached to the front of convertible cargo box 12 and frame 14 mounted onto a wheels mounted axle 16. Also shown is a tow coupler 15a and a tongue jack 15b attached to frame 14. Also shown is one of a pair of a drag-link 46 that are pivotally attached to frame 14 utilizing one of a pair of a drag-link mounting bolt 46b that is installed into one of a pair of a drag-link mounting bolt hole 46a.

Figure 1B:
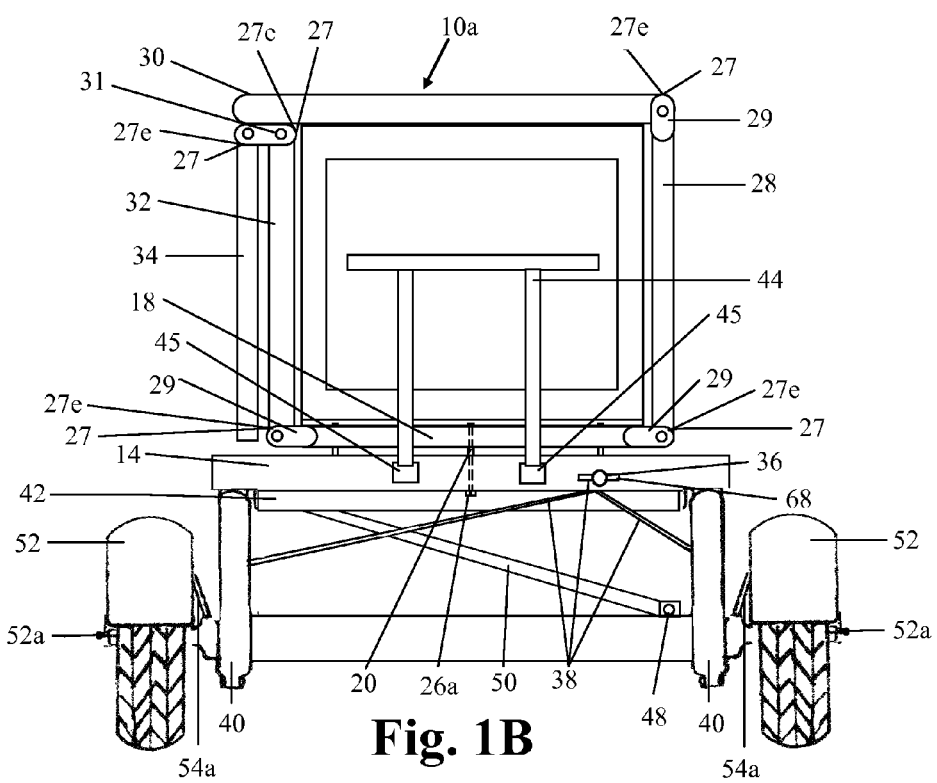
FIG. 1B shows a rear view of the trailer of FIG. 1A.

FIG. 1B (rear view) of trailer 10a of FIG. 1A (in the off road towing mode) shows a bottom panel 18 attached to frame 14 of FIG. 1A utilizing one of a pair of a bolt 20, with one of six of a nut 26a threaded thereon, welded perpendicular to the planar surfaces of bottom panel 18 onto the center of the bottom edges of both ends of bottom panel 18. Also shown is three of six of a single hinge plate 29 that are welded onto the front and the rear corners of bottom panel 18 and to the top front and the top rear corners of a right side panel 28. Also shown is right side panel 28 attached to bottom panel 18 utilizing a pair of a hinge assembly 27 that are welded into both of a typical panel end 27e of the bottom edge of panel 28. Also shown is a top panel 30 attached to side panel 28 utilizing hinges 27 that are welded into both top right ends 27e of top panel 30. Also shown is a left side panel 32 attached to bottom panel 18 utilizing hinges 27 that are welded into both bottom ends 27e of left side panel 32. Also shown is a optional left side panel 34 that is attached to left side panel 32 utilizing one of a pair of a double hinge plate 31 (of which are included only when any of the optional side or top panels are included) that are mechanically connected to hinges 27 that are welded into both top ends 27e of left side panels 32 and 34. Also shown attached to frame 14 is a air pressure regulator 36 with a air-line 38 attached that passes through frame 14 and connects to a pair of a pneumatic shock absorber 40. Also shown is a air supply tank 42 attached to frame 14 with a air-line 68 attached that passes through frame 14 and connects to air pressure regulator 36. Also shown welded to axle 16 is a anti-sway bar bottom mount 48b with a anti-sway bar 50 pivotally connected thereon. Also shown is a pair of a fender with braces 52 attached to a pair of a inner fender mount 54a that are welded to axle 16 and the inner braces of fenders 52 are attached to a pair of a outer fender mount 52a that are mechanically attached to the ends of axle 16. Also shown welded to frame 14 is a pair of a spare tire carrier mount 45 with a spare tire carrier 44 installed therein.

Figure 1C:
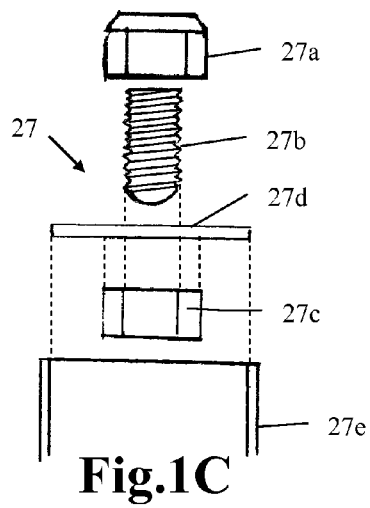
FIG. 1C shows an exploded view of the panel hinge assembly of FIG. 1B.

FIG. 1C (exploded view) shows hinge assembly 27 of FIG. 1B with a lock nut 27a that threads onto a threaded hinge pin 27b that installs through a flat washer 27d that welds into panel end 27e and threads into a nut 27c that welds onto flat washer 27d.

Figure 1D:
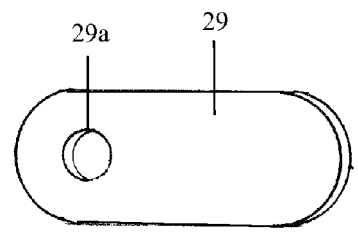
FIG. 1D shows a perspective view of the single hinge plate of FIG. 1B.

FIG. 1D (perspective view) shows single hinge plate 29 of FIG. 1B with a hinge pin hole 29a at one end.

Figure 1E:
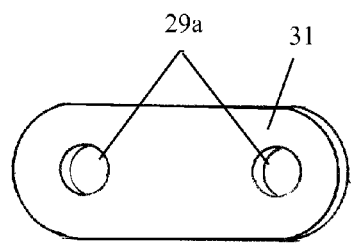
FIG. 1E shows a perspective view of the double hinge plate of FIG. 1B.

FIG. 1E (perspective view) shows double hinge plate 31 of FIG. 1B with hinge pin holes 29a of FIG. 1D at each end.

Figure 1F:
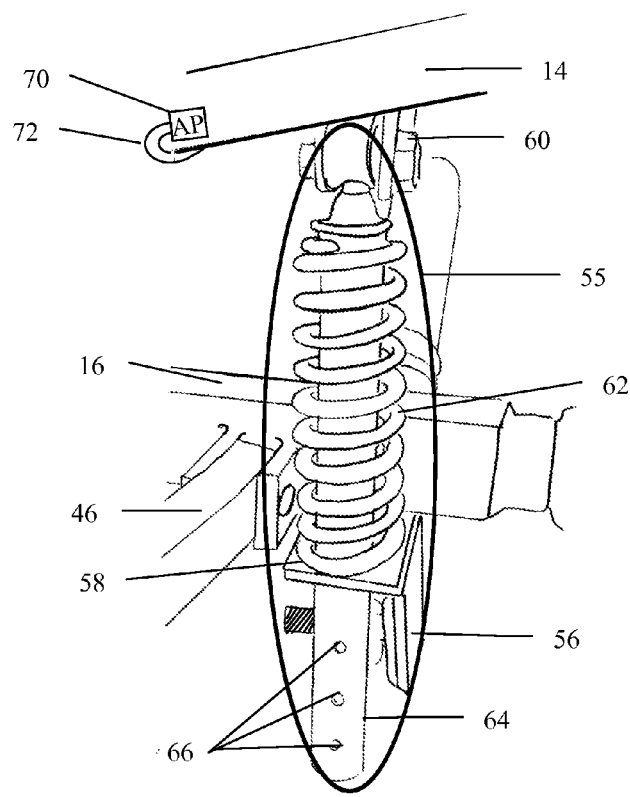
FIG. 1F shows a perspective view of a suspension assembly.

FIG. 1F (perspective view) shows one of a pair of a suspension assembly 55 (in the highway towing mode) with a coil spring guide rod mount 60 that is welded onto frame 14 of FIG. 1A with a coil spring guide rod 64 with a plurality of a elevation hole 66 therein that is attached to mount 60 and is installed through a coil spring guide rod plate 58. Also shown welded to axle 16 of FIG. 1A is a shock absorber bottom mount 56 with coil spring guide rod plate 58 that is welded thereon. Also shown is a coil spring 62 installed onto coil spring guide rod 64. Also shown welded to axle 16 is drag link 46 of FIG. 1A. Also shown is a air pump 70 that is attached to frame 14 with a air-line 72 attached that leads to air supply tank 42 of FIG. 1B.

Figure 1G:
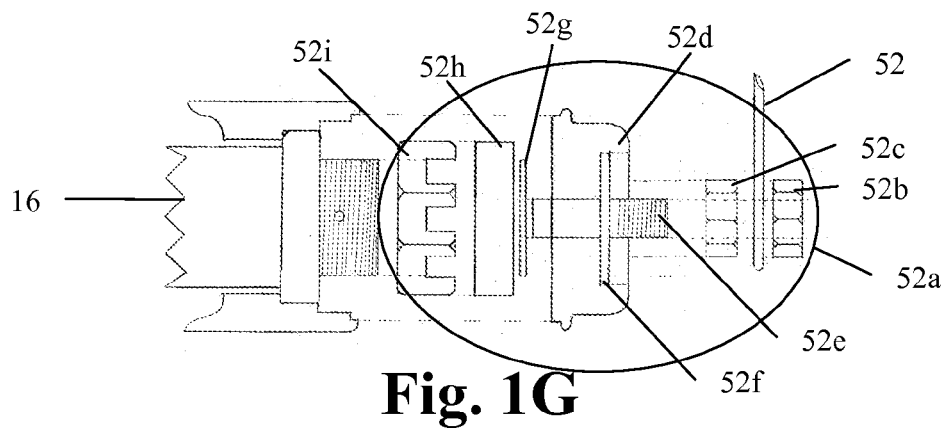
FIG. 1G shows an exploded view of the outer fender mount of FIG. 1B.

FIG. 1G (exploded view) shows outer fender mount 52a of FIG. 1B with a outer jam nut 52b and a inner jam nut 52c sandwiching the outer brace of fender with braces 52. Also shown is a threaded stud 52e with a grease cap 52d and a grease seal 52f that are installed thereon. Also shown is threaded stud 52e that welds onto a washer 52g that welds into a spacer 52h that welds onto a bearing nut 52i that threads onto the end of axle 16 of FIG. 1A.

Figure 1H:
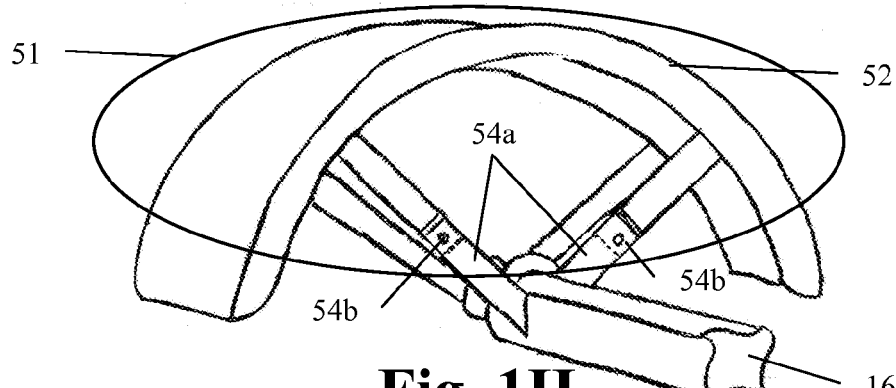
FIG. 1H shows a perspective view of the fender of FIG. 1B.

FIG. 1H (perspective view) shows a fender assembly 51 with fender 52 of FIG. 1B that is attached to axle 16 of FIG. 1A utilizing inner fender mount 54a of FIG. 1B that is welded to axle 16 with a fender 52 that is attached thereon utilizing a pair a nut 54b.

OPERATION

FIG. 1A to FIG. 1H

To form convertible cargo box 12 of FIG. 1A from the platform mode, raise side panels 28 and 29 of FIG. 1B at double hinge plate 31 of FIG. 1B and fold against front panel 22 of FIG. 1A and rear panel 24 of FIG. 1B. Rotate top panel 30 of FIG. 1B upward and raise side panel 32 of FIG. 1B and fold against panels 22 and 24. Lower top panel 30 of onto panels 22 and 24 and tighten all lock nuts 27a of FIG. 1C. After loading cargo, add air pressure into shock absorbers 40 of FIG. 1B by adjusting air pressure regulator 36 of FIG. 1B until springs 62 of FIG. 1F just start to rise from contact with plates 58 of FIG. 1F. Slowly lower air pressure until springs 62 start to compress to achieve maximum suspension performance.

To remove fender 52 of FIG. 1G from axle 16 of FIG. 1A loosen nut 52c of outer mount 52b of FIG. 1G and remove nuts 54b from inner fender mount 54a of FIG. 1H.

DETAILED DESCRIPTION

FIGS. 2A to 2D

In accordance of another embodiment, a toy hauler trailer 10b (in the off road towing mode), FIG. 2A (rear view) shows a model of cargo box 12 of FIG. 1A with a pair of a cargo rack 80 that are installed no more than 15 cm (six inches) below the top of the model of cargo box 12 into a plurality of a cargo rack mount 76 that are attached onto the front and rear of the model of cargo box 12. Also shown is the model of cargo box 12 that is built no more than 61 cm (24 inches) wide. Also shown is a rear panel 24 attached to frame 14 utilizing a pair of a bolt 26, with a pair of nut 26a that are threaded thereon, that are welded parallel to the planar surfaces of rear panel 24 and front panel 22 of FIG. 1A onto the bottom edges of panels 22 and 24 that pass through both ends of bottom panel 18 of FIG. 1B.

Figure 2A:
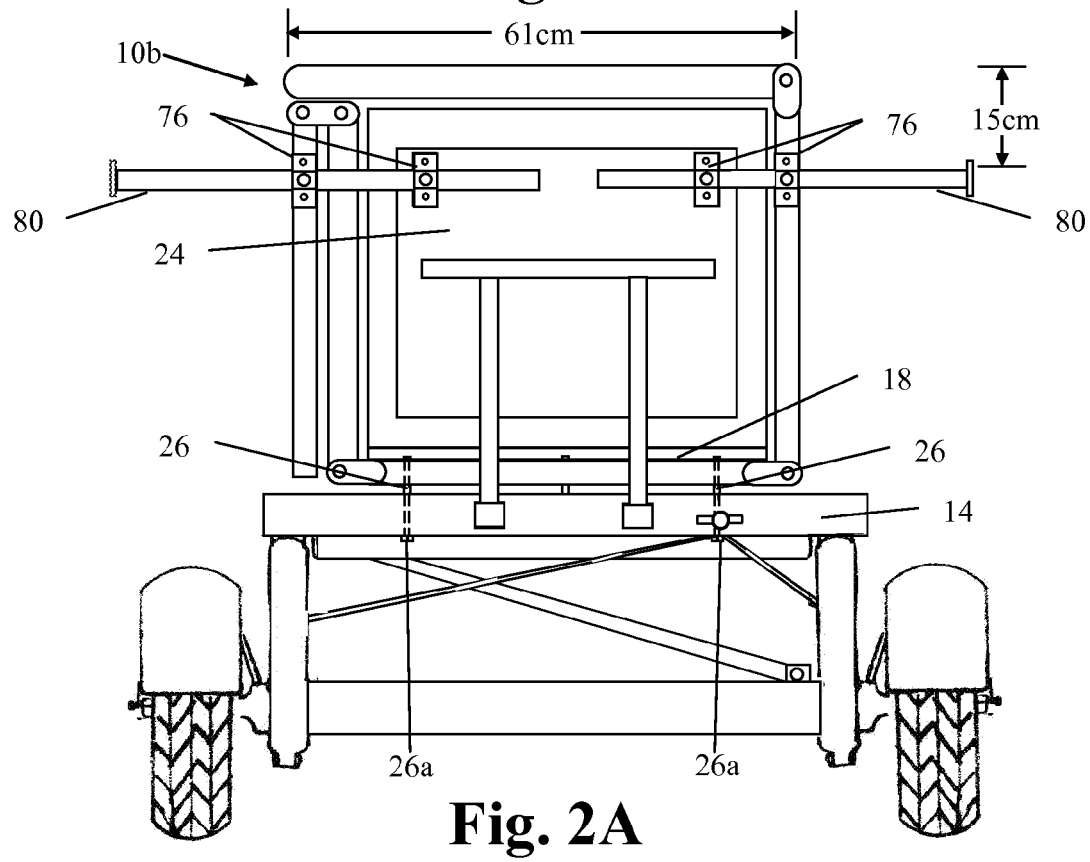
FIG. 2A shows a rear view of the toy hauler trailer embodiment.
Figure 2B:
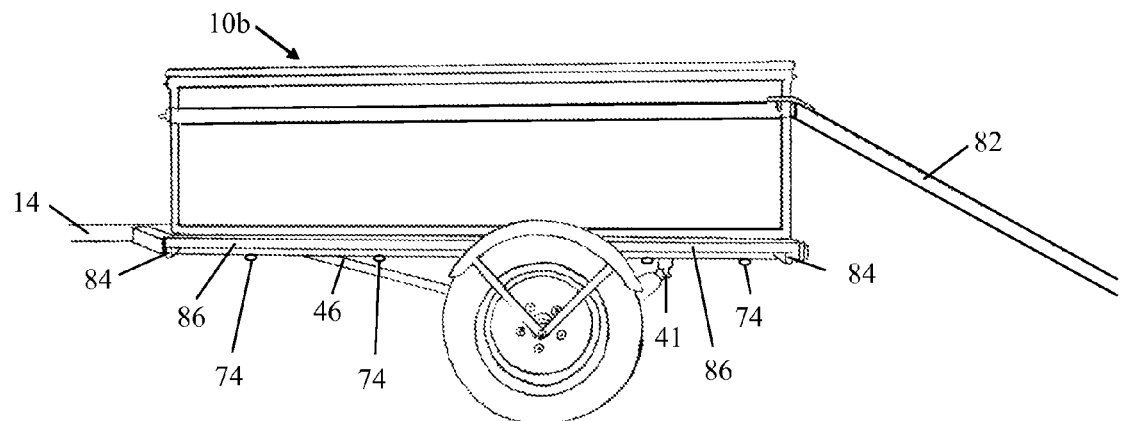
FIG. 2B shows a side view of the trailer of FIG. 2A.

FIG. 2B (side view) of trailer 10a of FIG. 1A (in the highway towing mode) shows one of a pair of a cargo ramp 82 that install onto the rear of cargo racks 80 of FIG. 1B. Also shown is one of the pair of drag-link 46 of FIG. 1F that is pivotally attached to frame 14 of FIG. 1A utilizing one of a pair of a drag-link mounting bolt 46b that is installed through one of a pair of a drag-link bolt hole 45a in frame 14. Also shown welded to frame 14 is a plurality of a cargo hook 74 and one of a pair of a shock absorber top mount 41. Also shown is a pair of a plurality of a outrigger mount 84 that are welded frame 14 with a pair of a outrigger 86 that are installed therein.

Figure 2C:
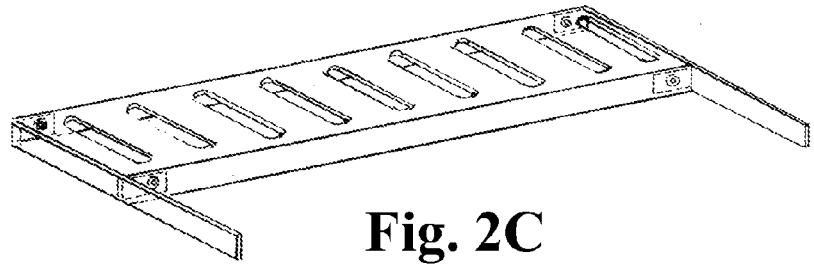
FIG. 2C shows a perspective view of the cargo rack of FIG. 2A.

FIG. 2C (perspective view) shows cargo rack 80 of FIG. 2A.

Figure 2D:
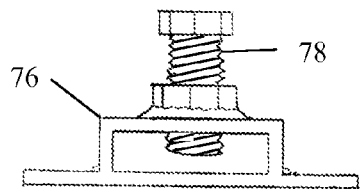
FIG. 2D shows a side view of the cargo rack mount of FIG. 2A.

FIG. 2D (side view) shows cargo rack mount 76 of FIG. 2A with a set screw 78 threaded therein.

OPERATION

FIGS. 2A to 2D

Install racks 80 of FIG. 2A into mounts 76 of FIG. 2A at the front and the rear of box 12 of FIG. 1A and adjust to accommodate the width of the cargo being loaded. Install ramps 82 of FIG. 2B onto racks 80. Tighten set screws 78 of FIG. 2D on mounts 76. After loading cargo, remove ramps 82 and securely strap onto frame 14 of FIG. 1A utilizing cargo hooks 74 of FIG. 2B. Add air pressure into shock absorbers 40 of FIG. 1B by adjusting air pressure regulator 36 of FIG. 1B until springs 62 of FIG. 1F just start to rise from contact with plates 58 of FIG. 1F. Slowly lower air pressure until springs 62 start to compress to achieve maximum suspension performance

DETAILED DESCRIPTION

Figure 3:
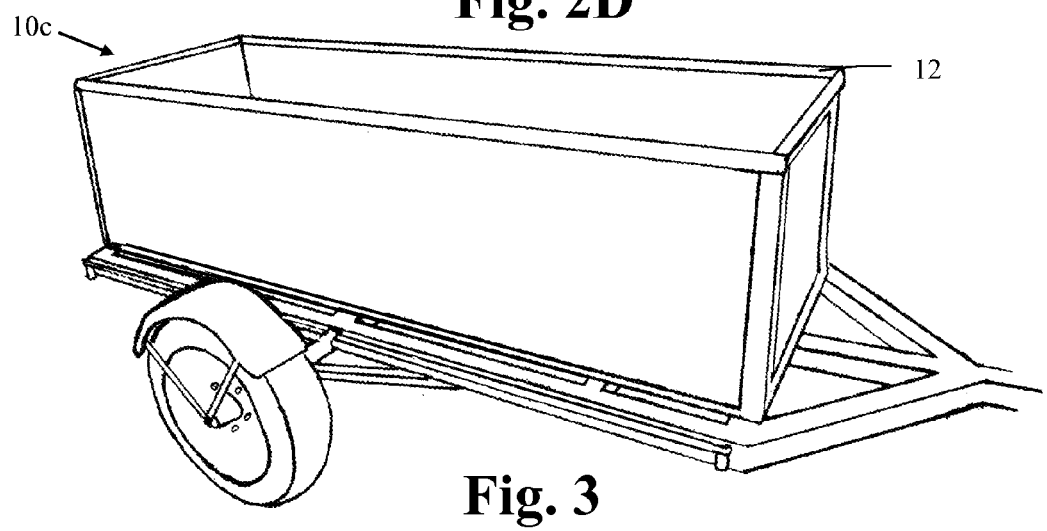
FIG. 3 shows a perspective view of the common wagon box trailer embodiment.

FIG. 3—Additional Embodiment

In accordance of another embodiment, a common wagon box trailer 10c (in the highway towing mode), FIG. 3 (perspective view) shows convertible cargo box 12 of FIG. 1A with top panel 30 of FIG. 1B removed.

OPERATION

FIG. 3

Remove threaded hinge pins 27b from hinges 27 of FIG. 1C of top panel 30 of FIG. 1B and remove top panel 30. After loading cargo, add air pressure into shock absorbers 40 of FIG. 1B by adjusting air regulator 36 of FIG. 1B until springs 62 of FIG. 1F just start to rise from contact with plates 58 of FIG. 1F. Slowly lower air pressure until springs 62 start to become compressed to achieve maximum suspension performance.

DETAILED DESCRIPTION

Figure 4:
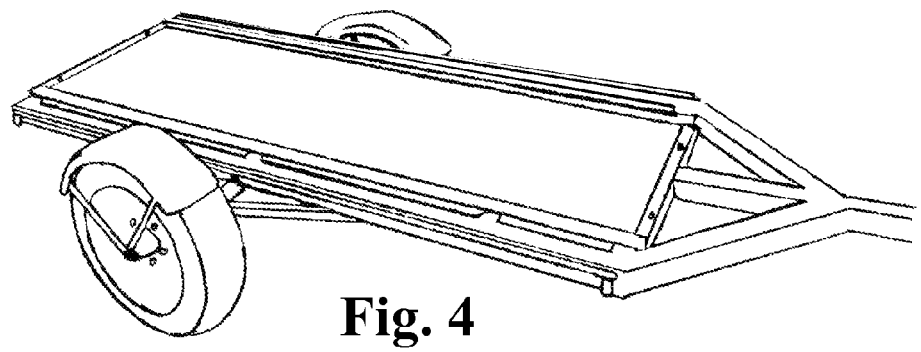
FIG. 4 shows a perspective view of the flat-bed trailer embodiment.

FIG. 4—Additional Embodiment

In accordance of another embodiment, a flat-bed trailer 10d (in the highway towing mode), FIG. 4 (perspective view) shows only bottom panel 18 of FIG. 1B in place.

OPERATION

FIG. 4

Remove threaded hinge pins 27b of FIG. 1C from hinges 27 of side panels 28, 32, 34, and top panel 30 of FIG. 1B. Remove top panel 30, side panels 28, 32, 34, and spare tire carrier 44 of FIG. 1B. Remove nuts 26a of FIG. 1B from bolts 26. Remove front panel 22 of FIG. 1A and rear panel of FIG. 1B. After loading cargo, add air pressure into pneumatic shock absorbers 40 of FIG. 1B by adjusting air pressure regulator 36 until springs 62 of FIG. 1F just start to rise from contact with plates 58 of FIG. 1F. Slowly lower air pressure until springs 62 start to become compressed to achieve maximum suspension performance

DETAILED DESCRIPTION

FIGS. 5A to 5E—Additional Embodiment

Figure 5B:
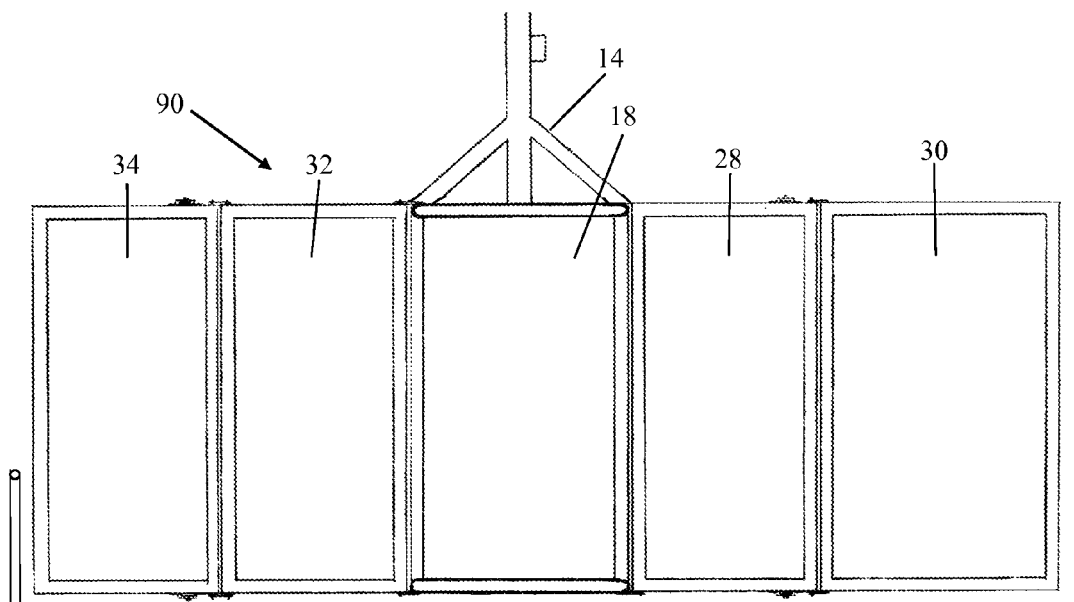
FIG. 5B shows a top view of the platform of FIG. 5A.
Figure 5A:
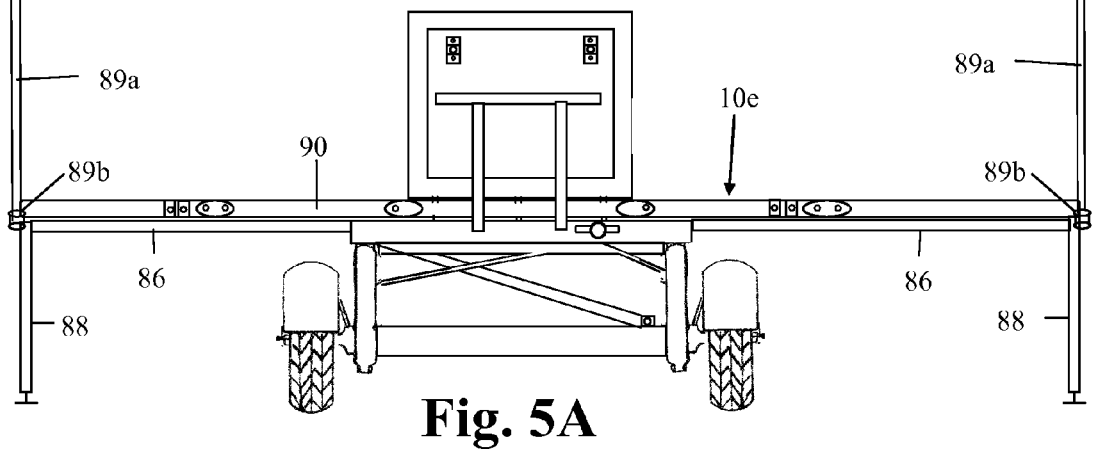
FIG. 5A shows a rear view of the raised platform embodiment.

In accordance of another embodiment, a raised platform 10e, FIG. 5A (rear view) shows frame 14 of FIG. 1A (in the raised platform mode) with outriggers 86 of FIG. 2B that are deployed with panels 28, 30, 32 and 34 of FIG. 1B unfolded thereon to form a platform 90. Also shown is a pair of a leveling jack 88 installed into outriggers 86 that are installed into a pair of outrigger mounts 84 of FIG. 2B. Also shown is a pair of a support pole 89a installed into a pair of a support pole mount 89b that are welded to the corners of frame 14.

FIG. 5B (top view) shows panels 28, 30, 32 and 34 of FIG. 1B unfolded into platform 90 of FIG. 5A.

Figure 5C:
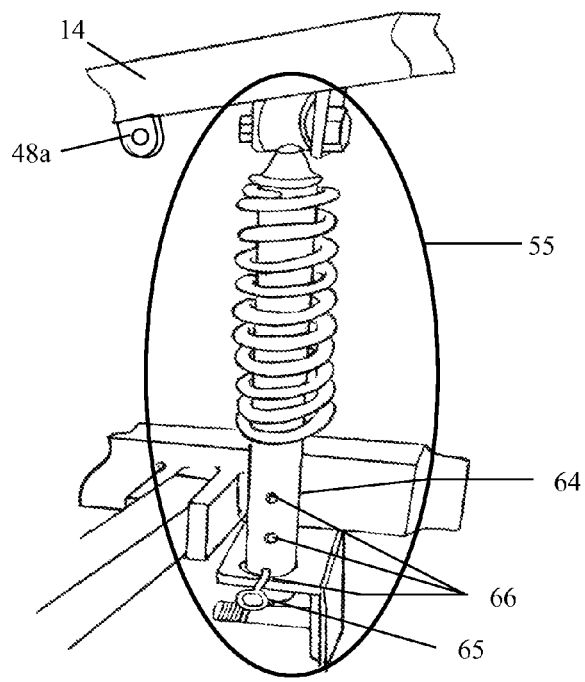
FIG. 5C shows another perspective view the of the suspension assembly of FIG. 1F.

FIG. 5C (perspective view) shows suspension assembly 55 of FIG. 1F (in the raised platform mode) with a retainer pin 65 that is installed into bottom hole 66 in coil spring guide rod 64 of FIG. 1F. Also shown is a anti-sway bar top mount 48a that is welded to frame 14 of FIG. 1A.

Figure 5D:
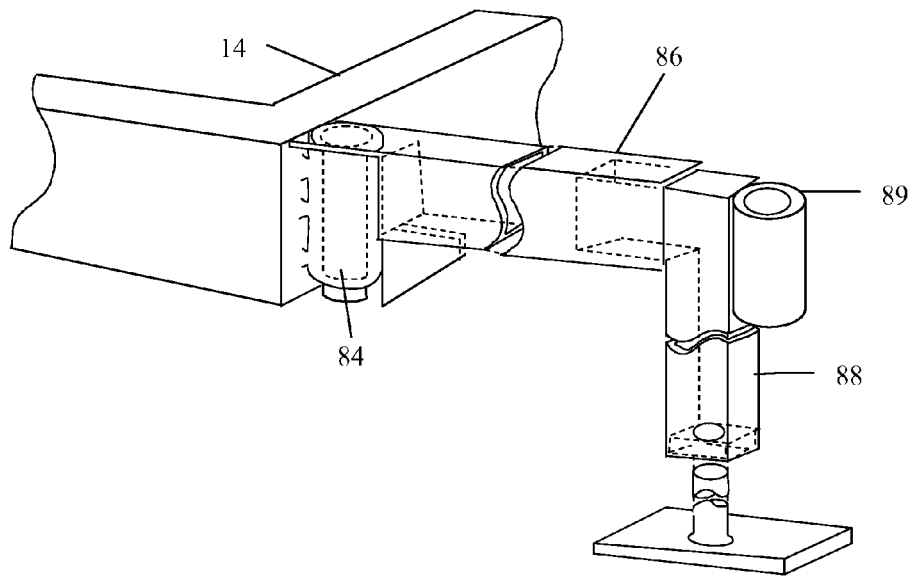
FIG. 5D shows a perspective view of the outrigger of FIG. 3

FIG. 5D (perspective view) shows outrigger 86 of FIG. 5A with leveling jack 88 installed therein. Also shown is outrigger mount 84 of FIG. 2B that is welded to frame 14 of FIG. 1A with outrigger 86 installed therein. Also shown is support pole mount 89b of FIG. 5A that is welded to leveling jack 88.

Figure 5E:
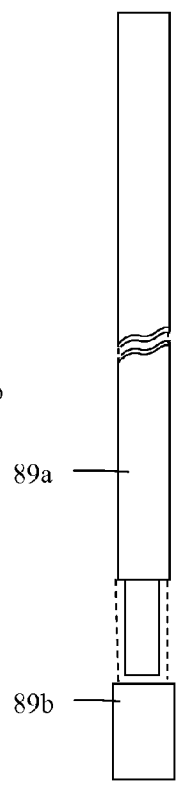
FIG. 5E shows a side view of the support pole of FIG. 5A

FIG. 5E (side view) shows pole 89a of FIG. 5D and pole mount 89b of FIG. 5A.

OPERATION

FIGS. 5A to 5

When setting up platform 90 of FIG. 5A on a level surface, fully elevate frame 14 of FIG. 1A into the raised platform mode by adjusting air regulator 36 of FIG. 1B until frame 14 is fully elevated. Insert pins 65 into bottom elevation holes 66 in rods 64 of FIG. 5C and release air pressure. Pivot outriggers 86 outward until they are at a 90 degree angle to frame 14 and install and adjust leveling jacks 88 to level outriggers 86. Unfold top panel 30 and side panels 28, 32, and 34 of FIG. 1B onto outriggers 86.

When setting up platform 90 on a sloping surface, park trailer 10a of FIG. 1A crosswise to the slope. Fully elevate frame 14 of FIG. 1A and install pin 65 of FIG. 5C into bottom hole 66 in rod 64 of FIG. 5C that is on the down-slope side. Slowly release air pressure until frame 14 is level. Install pin 65 into hole 66 of rod 64 that is just above plate 58 that is on the up-slope side and release the remaining air pressure. Pivot outriggers 86 outward until they are at a 90 degree angle to frame 14. Install and adjust jacks 88 to level outriggers 86 and unfold top panel 30 and side panels 28, 32, and 34 onto outriggers 86.

DETAILED DESCRIPTION

Figure 6A:
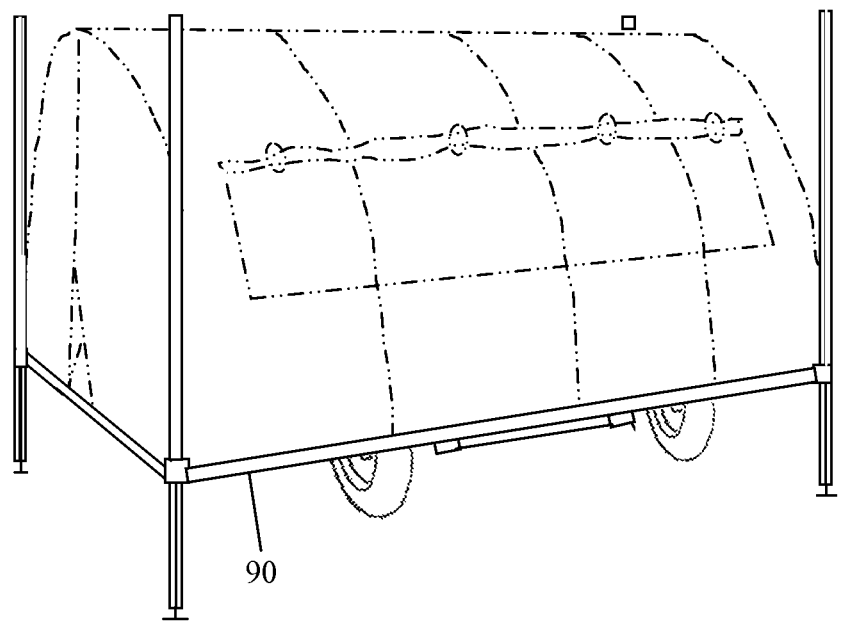
FIG. 6A is an illustration of a barrel tent erected upon the platform of FIG. 5A.
Figure 6B:
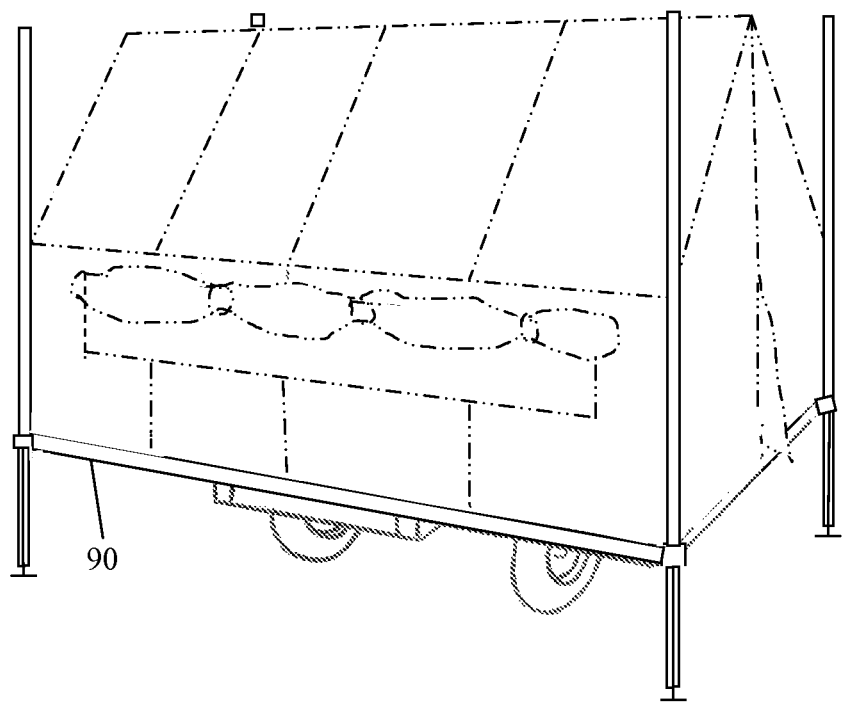
FIG. 6B is an illustration of a wall tent erected upon the platform of FIG. 5A.

FIGS. 6A and 6B

FIGS. 6A and 6B are illustrations of a barrel tent and a wall tent that are erected on platform 90 of FIG. 5

The above described panels are required to be of the load bearing type. Although any rigid type panel construction will suffice, it is contemplated at this time that these panels should be built with a tubular metal perimeter frame with joist type cross members and the planar surfaces clad with metal, fiberglass, vinyl or any composite type sheeting.

The above described frame, when being built for the basic embodiment, needs to be built light enough to be towed behind a mid-size motorcycle and may need to be built stronger for a variety of other applications. Therefore it is contemplated at this time that the frame to be built of steel, aluminum, fiberglass or a composite compound material as required for the accommodation of each application. Those skilled in the art can easily determine which material needs to be used as needed for each application.

What has been described herein is the basic embodiment of our new transforming cargo trailer system along with some of its variations. The terms and descriptions used herein are set forth by way of definition only and are not meant as limitations. Those skilled in the art will recognize that many variations are possible within the spirit and scope of the embodiments, of which are intended to be defined by the appended claims (and their legal equivalents), in which all terms are meant in their broadest reasonable sense unless otherwise indicated.

Conclusion, Ramifications, and Scope

Although there is a vast array of trailers that are great for their intended purposes, they are mostly single use trailers, therefore, the reader will see from the descriptions and the drawings that our transforming cargo trailer system has several advantages over any other trailers or trailer systems of which are totally unexpected and surprising when learning of our invention for the first time.

Extensive searching for these type of devices has failed to reveal any prior art that anticipates, renders obvious, suggests or even implies of any trailer system, trailer type device or any combination thereof that come even close to having the many embodiments, features, applications, and advantages of our new transforming cargo trailer system. For example, many of the advantages that are not addressed by any typical prior art are that our basic enclosed cargo box trailer embodiment:

is built light enough to be towed behind a medium size motorcycle, can be built longer and/or wider, and/or with additional hinge mounted side panels, and/or with additional hinge mounted top panels, when unfolded, will increase the area of the platform to accommodate various applications, has support poles for erecting a wide variety of tents upon the platform, when built to the specifications that include the smallest model of the toy hauler trailer embodiment, the cargo box is built narrow enough and the cargo racks are installed far enough below the top the cargo box, 4-wheel ATV's are able to straddle the cargo box, resulting in a lower center of gravity for the trailer, can be built with added axles assemblies to accommodate larger applications, can be built with an optional braking system, has removable cargo racks that are adjustable, whereby allowing for a larger variety of recreational vehicles or other cargo to be transported, can be easily reduced into a common wagon box trailer embodiment that can be used to help your buddy to move or used to haul a load of trash to the landfill, can be quickly reduced into a flat-bed trailer embodiment that can be used as a hunters' game hauling trailer, has a large internal cargo area for stowing camping gear or other cargo, has a plurality of cargo hooks for securing additional cargo to the frame, has pneumatic shock absorbers, when pressurized, can be adjusted for maximum suspension performance to elevate and level the frame for the raised platform embodiment or to raise the frame into the off road towing mode, has axle mounted fenders, so that when the frame is elevated into the raised platform embodiment, the hinged cargo box panels can be unfolded above the fenders, has a plurality of outriggers to level and support the platform, eliminates the chore of clearing a space to pitch a tent, ends the problems associated with sleeping on the ground, allows you to go camping with just one tow vehicle instead of going in a convoy, doesn't require a level surface upon which to be transformed into a platform, can be elevated into the off road towing mode and towed with an ATV or larger vehicle to reach a remote camping spot, requires very little maintenance, and is much more affordable than purchasing five trailers when one will do.

In addition, our new transforming cargo trailer system not only solves many of the problems that occur in the course of going camping or needing a trailer at home that can be used to solve a variety of transporting needs, our basic enclosed box trailer embodiment can also be easily transformed into, adapted into, and/or built in various sizes for many other applications, a sampling of which are:

a portable band stand,
a portable speakers platform,
a snow and ice sled,
a portable ice fishing shack,
a portable hunting blind,
a portable command tent platform for the armed forces or homeland security,
a portable personnel tent platform for the armed forces or homeland security,
a dune buggy trailer,
a snow mobile trailer,
a boat trailer, and
a jet ski trailer.

Although the above information contains many examples of the many embodiments, features, applications, and advantages that are not exhibited by any prior art, these should only be considered as examples of the versatility of our new transforming cargo trailer system, therefore, the scope should be determined by the appended claims (and their legal equivalents) rather than by the examples given.

We claim:

1. A transforming cargo trailer system in which a preferred configuration of said transforming cargo trailer system is a towable land vehicle, wherein said towable land vehicle is configurable as an enclosed box trailer, and said enclosed box trailer is designed to be transformed into a wagon box trailer, transformed into a raised platform, reduced into a flat-bed trailer, and adapted into a toy-hauler trailer, said enclosed box trailer comprising:

a convertible cargo box, wherein said convertible cargo box is attached onto a frame assembly, wherein said frame assembly is attached onto at least a pair of suspension assemblies, wherein the suspension assemblies are attached to a wheeled axle assembly and an air supply system, and said air supply system is attached to said frame assembly;

wherein said convertible cargo box comprises: a bottom panel, a removable front panel installed onto the front of said bottom panel, a removable rear panel installed onto the rear of said bottom panel, a hingedly mounted and removable right side panel attached to the right side of said bottom panel, a hingedly mounted and removable left side panel attached to the left side of said bottom panel, and at least one of a hingedly mounted and removable top panel attached to the top of at least one of the side panels, wherein the at least one of a top panel and the side panels are to be attached together such that they may be folded and unfolded accordion style, wherein the front and the rear panels each have a plurality of cargo rack mount holes therein;

wherein connections between the top and the side panels utilize a pair of double hinge plates, thereby allowing the panels to be positioned into any one of the configurations of: an enclosed box, a wagon box, and a raised platform;

wherein said bottom panel is attached onto the frame assembly, and wherein said frame assembly comprises: a frame, a tow hitch, a tongue jack, a plurality of cargo hooks, and a plurality of pivotally mounted outriggers, each outrigger including a detachable leveling jack;

wherein each of the suspension assemblies comprises: a coil spring, a coil spring guide rod with a plurality of elevation holes therein, and a pneumatic shock absorber;

wherein the axle assembly comprises: an axle, an anti-sway bar, a pair of drag links, and a pair of fenders;

and wherein said air supply system is attached to said frame assembly.

2. A transforming cargo trailer system in which a preferred configuration of said transforming cargo trailer system is a towable land vehicle, wherein said towable land vehicle is configurable as an enclosed box trailer, and said enclosed box trailer is designed to be transformed into a wagon box trailer, transformed into a raised platform, reduced into a flat-bed trailer, and adapted into a toy-hauler trailer, said enclosed box trailer comprising:

a convertible cargo box, wherein said convertible cargo box is attached onto a frame assembly, wherein said frame assembly is attached onto at least a pair of suspension assemblies, wherein the suspension assemblies are attached to a wheeled axle assembly and an air supply system, and said air supply system is attached to said frame assembly;

wherein said convertible cargo box comprises: a bottom panel, a removable front panel installed onto the front of said bottom panel, a removable rear panel installed onto the rear of said bottom panel, a hingedly mounted and removable right side panel attached to the right side of said bottom panel, a hingedly mounted and removable left side panel attached to the left side of said bottom panel, and at least one of a hingedly mounted and removable top panel attached to the top of at least one of the side panels, wherein the front and the rear panels each have a plurality of cargo rack mount holes therein;

wherein connections between the top and the side panels utilize a pair of double hinge plates, thereby allowing the panels to be positioned into any one of the configurations of: an enclosed box, a wagon box, and a raised platform;

wherein said bottom panel is attached onto the frame assembly, and wherein said frame assembly comprises: a frame, a tow hitch, a tongue jack, a plurality of cargo hooks, and a plurality of pivotally mounted outriggers, each outrigger including a detachable leveling jack;

wherein each of the suspension assemblies comprises: a coil spring, a coil spring guide rod with a plurality of elevation holes therein, and a pneumatic shock absorber;

wherein the axle assembly comprises: an axle, an anti-sway bar, a pair of drag links, and a pair of fenders;

wherein said air supply system is attached to said frame assembly;

wherein said air supply system comprises: an air tank, an air pressure regulator, a plurality of air lines, and an air pump, wherein said air pump is optional and air pressure may also be obtained from any air supply source;

wherein said at least one of a top panel can be removed, thereby transforming said enclosed cargo box trailer into said wagon box trailer;

wherein said frame assembly can be elevated into a raised platform position utilizing said pneumatic shock absorbers and said air supply system, whereby said outriggers can be rotated outwardly from said frame above said wheeled axle assembly, whereby said at least one of a top panel and the side panels can be unfolded onto the outriggers, thereby transforming said enclosed cargo box trailer into said raised platform;

wherein all of the at least one of a top panel, the front, the rear, the right side and the left side panels can be removed, thereby reducing said enclosed cargo box trailer into said flat-bed trailer;

and wherein a plurality of cargo rack mounts can be installed into the cargo rack mount holes in the front and the rear panels, and a pair of cargo racks can be installed into the mounts, thereby adapting said enclosed box trailer into said toy hauler trailer.

* * * * *